US008081866B2

(12) United States Patent
Watanabe et al.

(10) Patent No.: US 8,081,866 B2
(45) Date of Patent: Dec. 20, 2011

(54) SELECTED PLAYBACK APPARATUS, SELECTED PLAYBACK METHOD, AND PROGRAM

(75) Inventors: Katsuhiko Watanabe, Saitama (JP); Tetsuo Morimoto, Kanagawa (JP); Kou Kobayashi, Tokyo (JP); Kenichiro Imai, Kanagawa (JP); Yoshinobu Matsumoto, Kanagawa (JP)

(73) Assignee: Sony Corporation (JP)

( * ) Notice: Subject to any disclaimer, the term of this patent is extended or adjusted under 35 U.S.C. 154(b) by 1225 days.

(21) Appl. No.: 11/517,440

(22) Filed: Sep. 7, 2006

(65) Prior Publication Data
US 2007/0172200 A1 Jul. 26, 2007

(30) Foreign Application Priority Data
Sep. 8, 2005 (JP) ............................. P2005-260702

(51) Int. Cl.
*H04N 5/93* (2006.01)
(52) U.S. Cl. ....................... 386/248; 386/344
(58) Field of Classification Search .............. 386/46, 386/117, 120, 124–126, 343, 344, 248
See application file for complete search history.

(56) References Cited

U.S. PATENT DOCUMENTS

| | | | | |
|---|---|---|---|---|
| 4,667,314 A | * | 5/1987 | Iwashima | 369/178.01 |
| 6,031,797 A | * | 2/2000 | Van Ryzin et al. | 369/30.28 |
| 6,707,768 B2 | * | 3/2004 | Schilling et al. | 369/30.08 |
| 7,386,573 B2 | * | 6/2008 | Davis | 369/30.06 |
| 7,689,304 B2 | * | 3/2010 | Sasaki | 700/94 |
| 7,756,388 B2 | * | 7/2010 | Plastina et al. | 386/241 |
| 7,945,636 B2 | * | 5/2011 | Nelson et al. | 709/217 |
| 2003/0088582 A1 | * | 5/2003 | Pflug | 707/104.1 |
| 2004/0013810 A1 | * | 1/2004 | Hoefer et al. | 427/386 |
| 2005/0062888 A1 | * | 3/2005 | Wood et al. | 348/553 |
| 2005/0105806 A1 | * | 5/2005 | Nagaoka et al. | 382/224 |
| 2007/0168386 A1 | * | 7/2007 | Choi et al. | 707/104.1 |
| 2010/0146084 A1 | * | 6/2010 | Krikorian et al. | 709/219 |

FOREIGN PATENT DOCUMENTS

| | | | |
|---|---|---|---|
| JP | 2002-269958 | * | 9/2002 |
| JP | 2003-257163 | A | 9/2003 |
| JP | 2004-178727 | A | 6/2004 |
| JP | 2004-336566 | A | 11/2004 |

OTHER PUBLICATIONS

Machine generated translation of JP 2002-269958 to Ido, Sep. 2002.*
Machine generated translation of JP 2004-178727 to Murata, Jun. 2004.*

* cited by examiner

*Primary Examiner* — David Harvey
(74) *Attorney, Agent, or Firm* — Lerner, David, Littenberg, Krumholz & Mentlik, LLP

(57) ABSTRACT

A playback apparatus includes a classified region selecting section that selects a classified region at random from among a plurality of classified regions on a recording medium, the recording medium including recorded data managed such that a plurality of pieces of unit data belong to corresponding classified regions serving as data storage logical regions generated in accordance with a predetermined classification rule; a unit data selecting section that selects a piece of unit data from among the pieces of unit data that belong to the selected classified region; a reading section that reads from the recording medium the selected piece of unit data in order to play back the selected piece of unit data; and an execution controller that controls the repeated execution of a series of selecting and reading operations including selection of a classified region, selection of a piece of unit data, and reading of the selected piece of unit data.

13 Claims, 11 Drawing Sheets

FIG. 7

| t_pos1 | REGISTERED EVENT NUMBER |
|---|---|
| 0 | |
| 1 | |
| 2 | |
| 3 | |
| ⋮ | |
| n | |

FIG. 8

[EVENT NUMBER : 00000001]

| t_pos2 | REGISTERED FILE NUMBER |
|---|---|
| 0 | |
| 1 | |
| 2 | |
| ⋮ | ⋮ |
| m | |

[EVENT NUMBER : 00000002]

| t_pos2 | REGISTERED FILE NUMBER |
|---|---|
| 0 | |
| 1 | |
| 2 | |
| ⋮ | ⋮ |
| m | |

[EVENT NUMBER : 0000000X]

| t_pos2 | REGISTERED FILE NUMBER |
|---|---|
| 0 | |
| 1 | |
| 2 | |
| ⋮ | ⋮ |
| m | |

SELECTED PLAYBACK APPARATUS, SELECTED PLAYBACK METHOD, AND PROGRAM

CROSS-REFERENCE TO RELATED APPLICATIONS

The present application claims priority from Japanese Patent Application No. JP 2005-260702 filed on Sep. 8, 2005, the disclosure of which is hereby incorporated by reference herein.

BACKGROUND OF THE INVENTION

1. Field of the Invention

The present invention relates to a playback apparatus and method for playing back data recorded on a recording medium, and a program executed by the playback apparatus.

2. Description of the Related Art

Image-capturing apparatuses, such as video cameras and digital still cameras, configured to store information on captured images, such as static images or moving images, onto a recording medium have been widely used. In addition, since the cost of producing high-capacity recording media has significantly decreased, the capacity of recording media used in such image-capturing apparatuses has been increasing.

In a situation in which recording media have a small storage capacity, when the storage capacity of a recording medium runs out, the recording medium is replaced with another recording medium or data is often copied to a high-capacity recording medium, such as a hard disk drive (HDD). However, with the use of such increased-capacity recording media, exchange of recording media or data copying to another recording medium is not often performed. A usage pattern in which captured image information is recorded by being accumulated on the increased-capacity recording medium is considered.

In such a usage pattern, the number of pieces of image information recorded on a recording medium significantly increases. Thus, for an image-capturing apparatus to display image information recorded on a recording medium for the purpose of browsing, a playback function called a "slide-show function" is effective. Generally, for static images, the slide-show function sequentially displays captured image information automatically at predetermined intervals. Thus, it is unnecessary for users to perform operations for selecting captured image information to be displayed. The use of this function becomes more advantageous in accordance with an increase in the number of pieces of captured image information recorded on a recording medium.

A known technology is described, for example, in Japanese Unexamined Patent Application Publication No. 2004-336566.

In practice, however, when captured image information is recorded on a recording medium by video cameras or digital still cameras, the captured image information is normally managed in accordance with the order in which images were photographed. Thus, when such captured image information that is managed in accordance with the order in which images were photographed is sequentially displayed using the slide-show function, it is natural to display the captured image information in accordance with the order in which the images were photographed. That is, when the slide-show function is implemented, display of the captured image information starts from the most recently photographed image or from the first photographed image.

In practice, even when the slide-show function is implemented, a user does not necessarily view all the captured image information recorded on a recording medium. Thus, every time a slide show is presented, a user may view only captured image information whose capture time is relatively recent or only captured image information whose capture time is relatively old. It is difficult to view captured image information that is captured at an intermediate photographing time.

That is, for example, when sequential playback using the slide-show function is performed so as to correspond to a management system of recorded data on a recorded medium, playback is performed only in accordance with a predetermined order corresponding to the management system. Thus, there is a variation in the frequency of recorded data viewed, in terms of capture time.

SUMMARY OF THE INVENTION

As an image-capturing apparatus, a playback apparatus according to an embodiment of the present invention includes classified region selecting means for selecting a classified region at random from among a plurality of classified regions on a recording medium, the recording medium including recorded data managed such that a plurality of pieces of unit data belong to corresponding classified regions serving as data storage logical regions generated in accordance with a predetermined classification rule; unit data selecting means for selecting a piece of unit data from among the pieces of unit data that belong to the selected classified region; reading means for reading from the recording medium the selected piece of unit data in order to play back the selected piece of unit data; and execution control means for controlling the repeated execution of a series of selecting and reading operations including selection of a classified region by the classified region selecting means, selection of a piece of unit data by the unit data selecting means, and reading of the selected piece of unit data by the reading means.

With the above-described arrangement, recorded data is recorded on a recording medium such that pieces of unit data belong to a corresponding classified region. Thus, according to the embodiment of the present invention, in order to sequentially play back a plurality of pieces of unit data, as an operation for selecting and playing back a piece of unit data, a classified region is selected at random and the piece of unit data is selected from the selected classified region and is played back.

With this arrangement, for a playback order of unit data, randomness is introduced into the selection of a classified region. That is, the influence of a storage management system in which a plurality of pieces of unit data are classified into classified regions in the playback order of unit data is eliminated.

Accordingly, for sequential playback of recorded data using a slide-show function, a randomness is introduced into the playback order such that a variation in the frequency of recorded data played back, the variation being caused by a record management system of the recorded data, can be eliminated as much as possible. Thus, for example, more uniformity is achieved in the appearance of recorded data output by sequential playback. Thus, users are able to utilize a sequential playback function more effectively.

BRIEF DESCRIPTION OF THE DRAWINGS

FIG. 7 shows a configuration example of an event selection management table;

FIG. 8 shows a configuration example of a file selection management table;

DETAILED DESCRIPTION

Embodiments of the present invention will be described. An example in which a playback apparatus according to an embodiment of the present invention is applied to a digital camera will be described. The digital camera according to this embodiment is configured to be capable of recording and playing back static images and moving images using a captured image recording and playback function.

Figure 1:
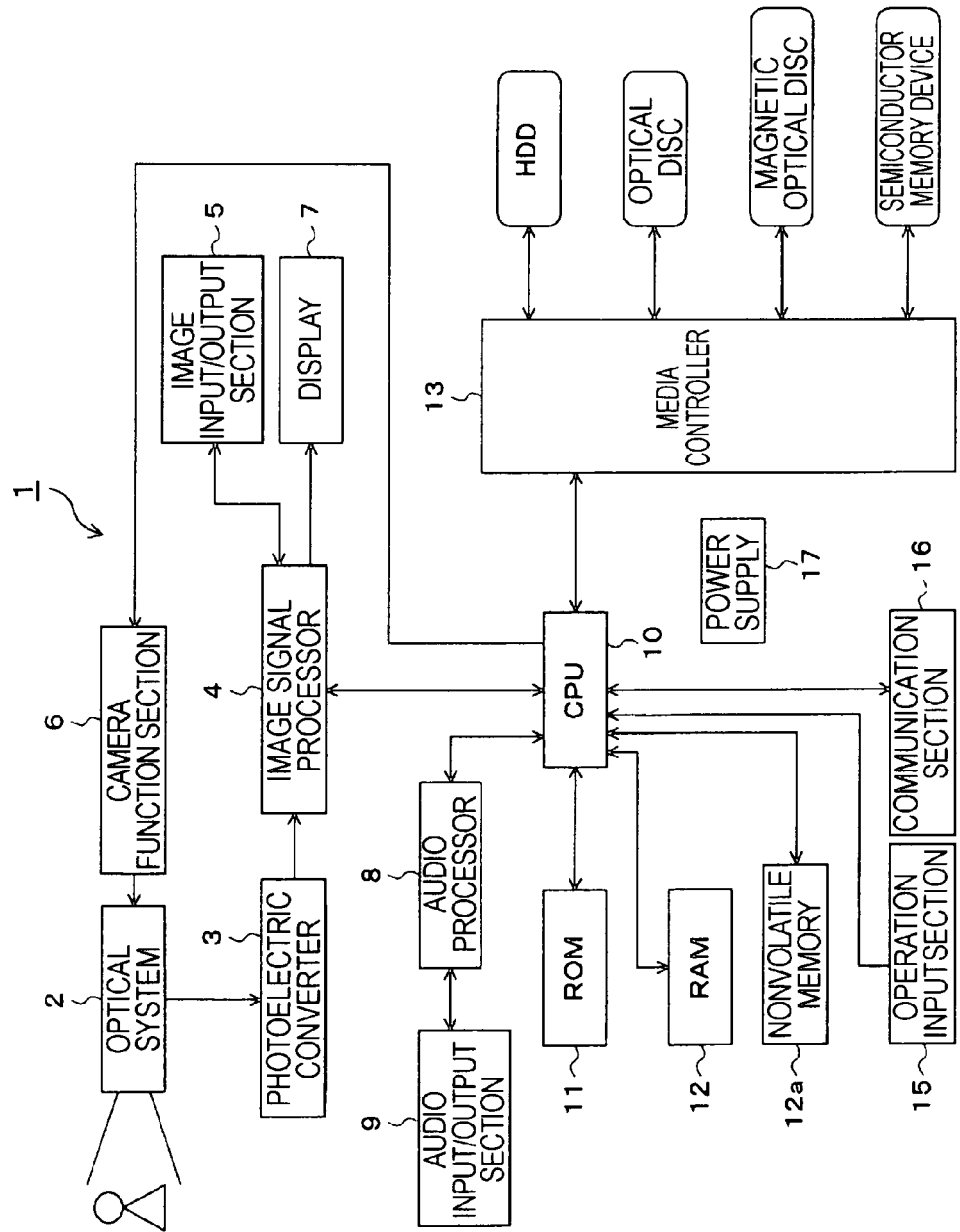
FIG. 1 shows an example of the configuration of a digital camera according to an embodiment of the present invention.

FIG. 1 is a block diagram showing an example of the configuration of a digital camera 1 according to this embodiment.

In the digital camera 1 shown in FIG. 1, an optical system 2 includes an image-capturing lens, a diaphragm, and the like. The optical system 2 forms an image on a photoelectric converter 3 using incident light as image-capturing light. The optical system 2 also includes a focus adjustment mechanism for focus adjustment, a diaphragm change mechanism for changing the diaphragm in accordance with an aperture, and the like. Such mechanisms are driven in accordance with driving signals output from a camera function section 6. The camera function section 6 is configured to output desired driving signals to achieve a proper focus state, a proper diaphragm state, and the like under the control of a central processing unit (CPU) 10.

In addition, for example, when an optical zoom function is provided, the optical system 2 can be provided with a zoom mechanism for moving a zoom lens and a driving unit for moving the zoom mechanism under the control of the CPU 10. In addition, the camera function section 6 may include a stroboscope, and thus may be provided with a strobe emission function.

The photoelectric converter 3 includes, for example, a charge-coupled device (CCD), which is a photoelectric conversion element. The photoelectric converter 3 generates an image-capturing signal by photoelectrically converting image-capturing light that is incident from the optical system 2 and that is focused on a light-receiving surface, and outputs the generated image-capturing signal to an image signal processor 4. When photography is performed, for example, the CPU 10 gives to the image signal processor 4 an indication of shutter speed determined in accordance with an exposure set result. The image signal processor 4 outputs to the photoelectric converter 3 a scanning timing signal corresponding to the given shutter speed. The photoelectric converter 3 performs photoelectric conversion processing by performing scanning in accordance with the scanning timing signal, and outputs an image signal.

The image signal processor 4 performs waveform shaping on an analog video signal (captured image signal) received from the photoelectric converter 3 by performing, for example, gain adjustment and sample-and-hold processing, and converts the processed analog video signal into digital video signal data. Then, the image signal processor 4 performs video signal processing, such as processing for generating display luminance data, on the converted digital video signal so as to be displayed on a display 7. Thus, the image signal processor 4 is capable of performing signal processing for so-called on-screen display such that a character image or the like can be displayed superimposed on a captured image, under the control of the CPU 10.

A display device used as the display 7 is not particularly limited. In the present situation, however, a liquid crystal display panel is widely adopted as the display device.

For a static image photography mode, the image signal processor 4 generates data of a static image file in a predetermined picture format by performing image data compression in a predetermined system on the analog video signal received from the photoelectric converter 3.

For a moving image photography mode, the image signal processor 4 generates compressed video data by performing compression and encoding processing in a predetermined system on the digital video signal acquired by converting the analog video signal received from the photoelectric converter 3.

In addition, the image signal processor 4 is configured to convert the image (video) signal received from the photoelectric converter 3, a file of audio video (AV) data (AV file) read from a medium described below, or the like into an analog video signal or a digital video signal in a predetermined format and to output the analog video signal or the digital video signal to an external apparatus or the like via an image input/output section 5.

The image input/output section 5 is configured to receive a video signal in a predetermined format from the external apparatus, to cause the received video signal to be subjected to processing of the image signal processor 4, and to cause the processed video signal to be displayed on the display 7. In addition, the image signal processor 4 is capable of converting the video signal received by the image input/output section 5 into recording data and transferring the recording data to a media controller 13, similarly to the analog video signal received from the photoelectric converter 3.

Thus, the image input/output section 5 includes, for example, a video (image) signal output terminal/video signal input terminal based on a predetermined system.

The digital camera 1 according to this embodiment also includes an audio processor 8 and an audio input/output section 9. Thus, the digital camera 1 is capable of inputting and outputting audio signals.

For audio input, the audio input/output section 9 includes a microphone and the like. The audio input/output section 9 collects external sound, and converts the collected sound into an audio signal. Accordingly, the audio input/output section 9 acquires sound. Then, the audio input/output section 9 outputs the acquired audio signal to the audio processor 8. For the moving image photography mode, for example, the audio processor 8 performs audio signal processing, such as conversion into compressed audio data encoded by an audio compression and encoding system corresponding to compression and encoding processing for a captured image. For the static image photography mode, audio signal processing for generating audio data in a predetermined format corresponding to data of a static image file is performed. In addition, an independent audio data file in a predetermined format can be generated.

For the moving image photography mode, the CPU 10 performs control processing for generating a moving image file in a predetermined format from compressed video data of a captured image acquired by the image signal processor 4 and compressed audio data of collected sound acquired by the audio processor 8. This moving image file is formed such that the playback time axis of sound output by playing back the compressed audio data is synchronized with a moving image output by playing back the compressed video data. A configuration for forming a moving image file may be a software configuration achieving digital signal processing acquired by the CPU 10 executing a program. Alternatively, the configuration for forming the moving image file may be a hardware configuration for forming a moving image file, and the CPU 10 may be configured to control the operation of the hardware.

Data as such a moving image file, data as a static image file generated for the static image photography mode, and audio data generated by the audio processor 8 in accordance with sound collected by the microphone or the like of the audio input/output section 9 are transferred as recording data to the media controller 13, for example, under the control of the CPU 10.

The audio input/output section 9 may include an audio signal input terminal and the like. Thus, the audio input/output section 9 may be configured to receive an audio signal from an external audio apparatus or the like. The audio input/output section 9 converts the audio signal received by the audio signal input terminal into a digital audio data file in a predetermined format. The CPU 10 is capable of transferring data of such a digital audio data file to the media controller 13 as recording data.

The media controller 13 is configured to perform, in cooperation with the CPU 10, control processing for data processing for predetermined different types of external media (storage media) and external storage devices. The data processing for the media means some processing for data to be stored on media, such as format processing for media, and writing/reading processing of a file and information for file management (file management information) for a storage region of media.

In this embodiment, a hard disk drive (HDD) is connected to the media controller 13. HDDs are storage devices including a magnetic disk as a storage medium, which is known as a hard disk. In the present situation, HDDs at relatively low cost have a large capacity on the order of gigabytes. In addition, as is well known, reading/writing of physical data from/onto a magnetic disk, such as a storage medium, is realized by a magnetic head applying and detecting a magnetic field while tracing a track formed on the magnetic disk.

An HDD used in this case may be, for example, fixed within the digital camera 1 or may be mountable onto and dismountable from the digital camera 1 (host) in a removable form based on a predetermined specification.

As shown in FIG. 1, the media controller 13 is also capable of performing data processing for an optical disc, a magnetic optical disc, and a semiconductor memory device, which is a storage device including a semiconductor memory element, in predetermined formats.

When an optical disc, a magnetic optical disc, or the like is handled, a device serving as a drive configured to write/read data onto/from such a recording (storage) medium is connected to the media controller 13.

When a semiconductor memory device is handled, a slot into/from which the semiconductor memory device is mounted/dismounted is provided in the main body of the digital camera 1 in accordance with the actual specification of the semiconductor memory device. When the semiconductor memory device is properly placed into the slot, a pin terminal of the semiconductor memory device is connected to an electrode of a connector portion of the slot. Thus, the semiconductor memory device is connected to the digital camera 1 such that communication between the semiconductor memory device and the media controller 13 can be achieved.

The media controller 13 receives recording data, as described above, and transfers the recording data to a selected medium from among media (including storage media and storage devices) connected to the media controller 13. The medium receives the transferred data, and writes and stores the data in a storage region in accordance with an instruction from the media controller 13. Accordingly, data (including AV files, static image files, audio data, and the like) stored in media can be stored as files. A predetermined file system manages files stored in media.

For example, in order to play back a moving image file stored in a medium, the CPU 10 and the media controller 13 access the designated moving image file and read the moving image file. The read moving image file is separated, for example, by the processing of the CPU 10, into compressed video data and compressed audio data. The compressed video data is delivered to the image signal processor 4, and the compressed audio data is delivered to the audio processor 8.

In this case, the image signal processor 4 and the audio processor 8 perform predetermined playback signal processing including demodulation processing on the transferred compressed video data and compressed audio data, respectively. Thus, an image acquired by playing back the compressed video data can be displayed on the display 7. In addition, in synchronization with the playback time of the image, an audio signal acquired by playing back the compressed audio data can be output as sound from a speaker of the audio input/output section 9 or from a headphone terminal.

In addition, for example, an audio data file played back from a medium may be output as an audio signal or audio data in a predetermined format to an external apparatus via the audio input/output section 9 after being subjected to audio signal processing by the audio processor 8. In this case, the audio input/output section 9 includes an audio output terminal corresponding to the predetermined format of the audio signal or audio data output from the audio processor 8.

The CPU 10 executes programs to perform various types of control processing for the digital camera 1. Various programs executed by the CPU 10 and various types of setting information used by the CPU 10 to execute processing are stored in a read-only memory (ROM) 11. A random-access memory (RAM) 12 is used as a work area when the CPU 10 performs processing based on a program. Data, such as various arithmetic results, is stored in the RAM 12.

In addition, a nonvolatile memory 12a includes a memory device, such as a flash memory, whose storage contents are not lost even after power supply stops writing/reading of data into/from the nonvolatile memory 12a is performed under the control of the CPU 10. Generally, data (information) to be stored in the nonvolatile memory 12a is setting information whose contents are changed when necessary. However, the data (information) to be stored in the nonvolatile memory 12a is not particularly limited to this. Various types of information can be stored in the nonvolatile memory 12a in accordance with the actual specification of the digital camera 1.

In this case, various operators provided on the digital camera 1 are collectively represented as an operation input section 15. For example, the operation input section 15 includes a shutter button operated when photography is performed, an operator for selecting a photography mode, an operator for adjusting a parameter, and the like.

In addition, in this case, for example, the operation input section 15 has a configuration achieving an input operation as a graphical user interface (GUI) using a display screen of the display 7.

A communication section 16 is configured to include hardware and software for communicating with an external device in accordance with a predetermined data communication system under the control of the CPU 10. The data communication system supported by the communication section 16 is not particularly limited, irrespective of wired communication or wireless communication. In addition, the number of data communication systems supported by the communication section 16 is not limited. In the present situation, for wired communication, a data bus standard, such as a network including Ethernet™, a universal serial bus (USB), or the Institute of Electrical and Electronic Engineers (IEEE) 1394, can be used as a data communication system. In addition, for wireless communication, a wireless local-area network (LAN) standard, such as short-range wireless communication between devices including Bluetooth™ or IEEE 802.11a/b/g, can be used as a data communication system.

A power supply 17 supplies operation power to various hardware devices in the digital camera 1. For example, the power supply 17 includes a power supply circuit that receives power from a battery or a power supply adapter to perform an operation.

Figure 2:
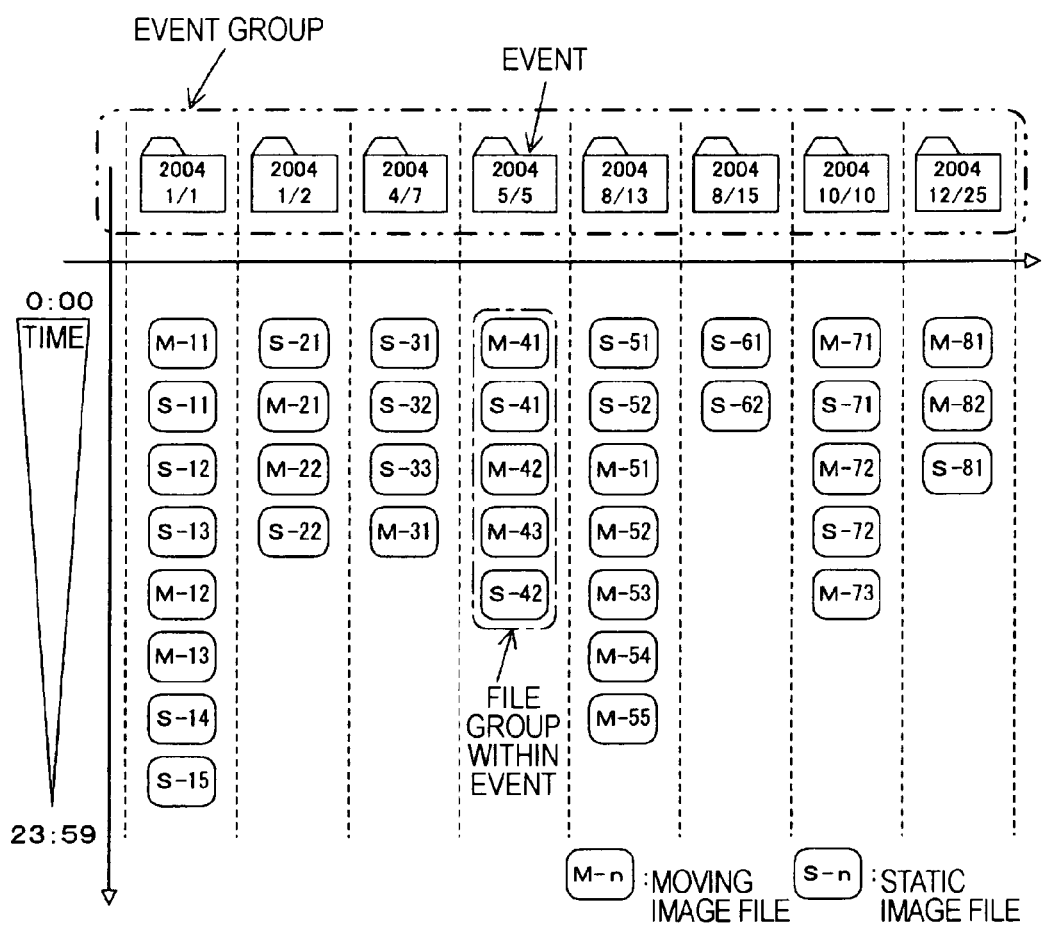
FIG. 2 schematically shows an example of a management state of image files recorded on a medium.

FIG. 2 schematically shows an example of a management state of data (recorded data) recorded on a medium (recording medium) by the digital camera 1 having the above-described configuration. In FIG. 2, two types of files, moving image files and static image files, are recorded as files (unit data) on the medium. For the sake of explanation, independent files as audio data are not recorded in this example.

Directories represented as events (classified regions) are disposed on the medium. In FIG. 2, a set of events is represented as an event group. In this case, events are classified on the basis of dates on which files are recorded (recorded dates of files). The files are stored in a hierarchical layer lower than that of the events. In FIG. 2, the following eight events are disposed from the left to the right as events within an event group:

| | |
|---|---|
| file recorded date = | "Jan. 1, 2004"; |
| file recorded date = | "Jan. 2, 2004"; |
| file recorded date = | "Apr. 7, 2004"; |
| file recorded date = | "May 5, 2004"; |
| file recorded date = | "Aug. 13, 2004"; |
| file recorded date = | "Aug. 15, 2004"; |
| file recorded date = | "Oct. 10, 2004"; and |
| file recorded date = | "Dec. 25, 2004". |

In the file system used in this embodiment, the directories as the events are managed by providing directory names based on recorded dates of files. For example, for the event (file recorded date="January 1, 2004") is provided with a file name generated in accordance with a predetermined rule by using a value representing "January 1, 2004". In the following descriptions, when a description identifying an event is provided, a corresponding file recorded date is indicated within a square bracket, such as an event [2004/1/1].

For example, a moving image file M-41, a static image file S-41, a moving image file M-42, a moving image file M-43, and a static image file S-42 are stored in an event [2004/5/5]. Here, a set of one or more files stored within an event is referred to as a file group within the event.

In this embodiment, a file group within an event is managed in accordance with file recorded times on the file recorded date of the event. In FIG. 2, the file group within the event [2004/5/5] is represented such that the files are arranged from the top to the bottom in the order in which the files were recorded. That is, the moving image file M-41, the static image file S-41, the moving image file M-42, the moving image file M-43, and the static image file S-42 were recorded onto the medium in that order. Thus, these files are managed in accordance with the order based on the recorded times within the event [2004/5/5].

In addition, for example, under the control of the file system, the file name of each file stored in an event is provided in accordance with the recorded time of the file. In FIG. 2, a sign assigned to each file, such as "M-n" or "S-n", is used merely for identification of the file. Thus, this sign is not particularly related to the actual file name.

In this embodiment, in order to manage events and files in accordance with recorded dates and times, as described above, for example, a watch function of the CPU 10 can be used.

The digital camera 1 according to this embodiment has the configuration shown in FIG. 1 and has a sequential playback function like a slide show for moving image files and static image files recorded on a medium and managed in the state described above. That is, the digital camera 1 repeats an operation for reading a moving image file or a static image file (hereinafter, a moving image file and a static image file are generally referred to as image files) recorded on a medium one by one and displaying the read image file on the display 7 (sound may be played back at the same time). In this embodiment, in the sequential playback processing, a static image file is displayed during a predetermined period of time set in advance. In addition, a moving image file is displayed from the beginning to the end thereof. However, for the moving image file, the longest playback time may be set in advance.

In practice, in order to implement the above-described sequential playback function, playing back image files in an ascending order or descending order based on recorded dates and times can be realized by, for example, the simplest algorithm. As described above, in this embodiment, files recorded on a recording medium are managed in accordance with recorded dates and times of the files. Thus, the sequential playback function can be readily implemented with the configuration of the digital camera 1 according to this embodiment.

However, performing sequential playback in accordance with an order determined from recording dates and times causes the above-described problems.

Thus, the digital camera 1 according to this embodiment performs sequential playback while selecting files at random (hereinafter, referred to as "random playback"). When such random playback is performed, sufficient consideration is given so that a variation in the appearance frequency of files in terms of recorded date and time, which is used for file management, can be reduced to as small as possible.

A procedure for performing random playback in this embodiment will be schematically explained with reference to FIGS. 3 to 6.

Figure 3:
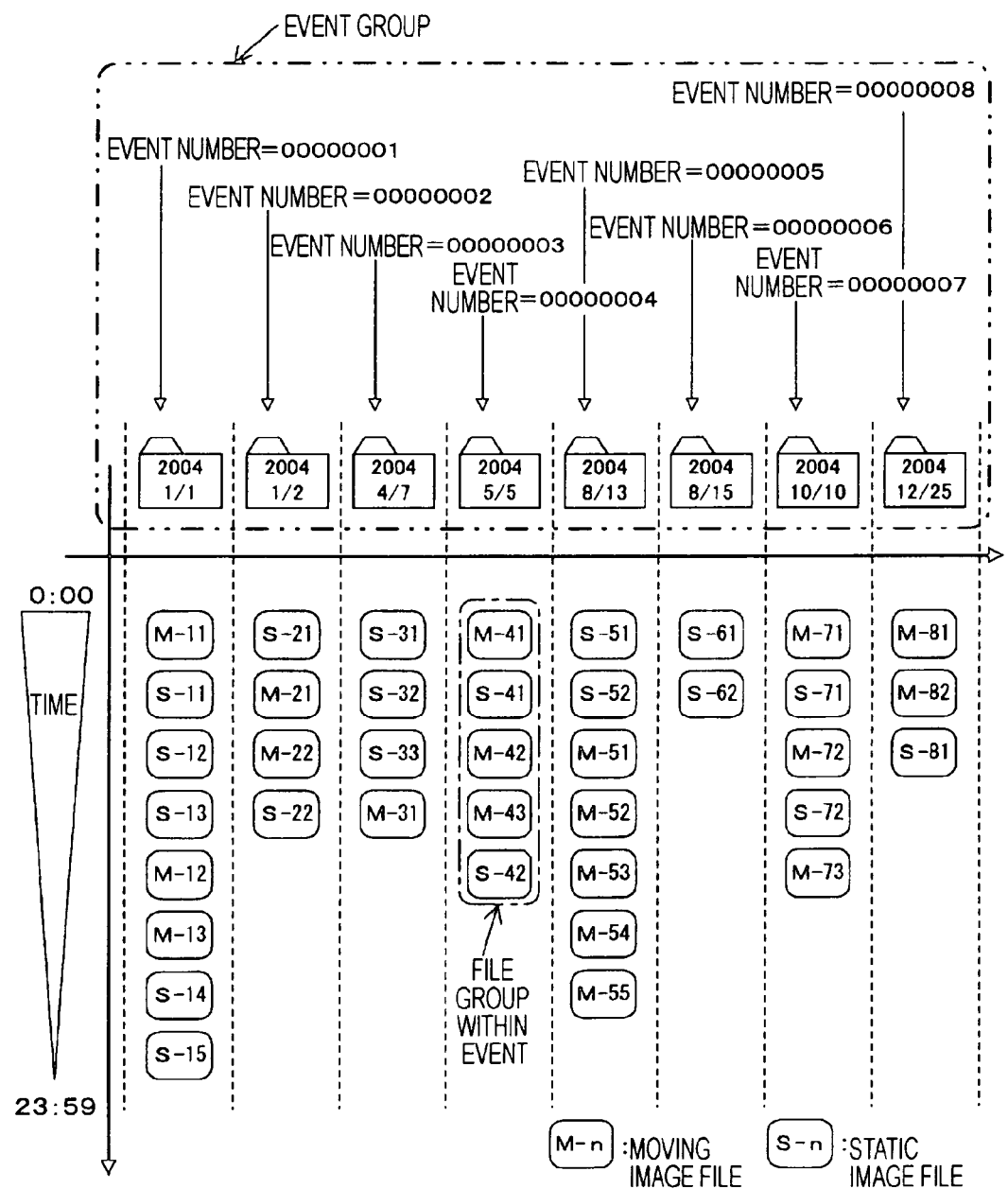
FIG. 3 shows a case where event numbers are assigned to events constituting an event group in the management state shown in FIG. 2.

In order to perform random playback, event numbers are assigned to events forming an event group, as shown in FIG. 3. Different event numbers are assigned to events, and serial numbers are assigned when viewed as a whole. In this case, for example, the following event numbers are assigned to the events:

an event number 00000001 is assigned to the event [2004/1/1];

an event number 00000002 is assigned to the event [2004/1/2];

an event number 00000003 is assigned to the event [2004/4/7];

an event number 00000004 is assigned to the event [2004/5/5];

an event number 00000005 is assigned to the event [2004/8/13];

an event number 00000006 is assigned to the event [2004/8/15];

an event number 00000007 is assigned to the event [2004/10/10]; and an event number 00000008 is assigned to the event [2004/12/25].

As described above, the serial event numbers are assigned to the events. This is because random selection of an event is performed for random playback, as described later. That is, random numbers are used for the actual random selection. Since a random number is merely information as a numerical value, it is necessary to identify a 1-to-1 relationship between the numerical value generated by the random number and an event. Thus, in order to achieve a correspondence between an event name set based on a recorded date and a numeral value generated by a random number, a complicated algorithm is used. Thus, by assigning serial event numbers to events, the correspondence between an event number and a numerical value generated by a random number can be directly identified. Normally, random numbers occur in a range of consecutive numerical values. Thus, serial event numbers are assigned. The correspondence between the events and the event numbers described above is merely an example. The order of the serial event numbers does not necessarily correspond to the order of the recorded dates of the events. Serial event numbers may be assigned in any order as long as a 1-to-1 relationship is achieved between an event and an event number.

In addition, the event numbers set as described above may be used fixedly during a period of time from the beginning to the end of the random playback.

Figure 4:
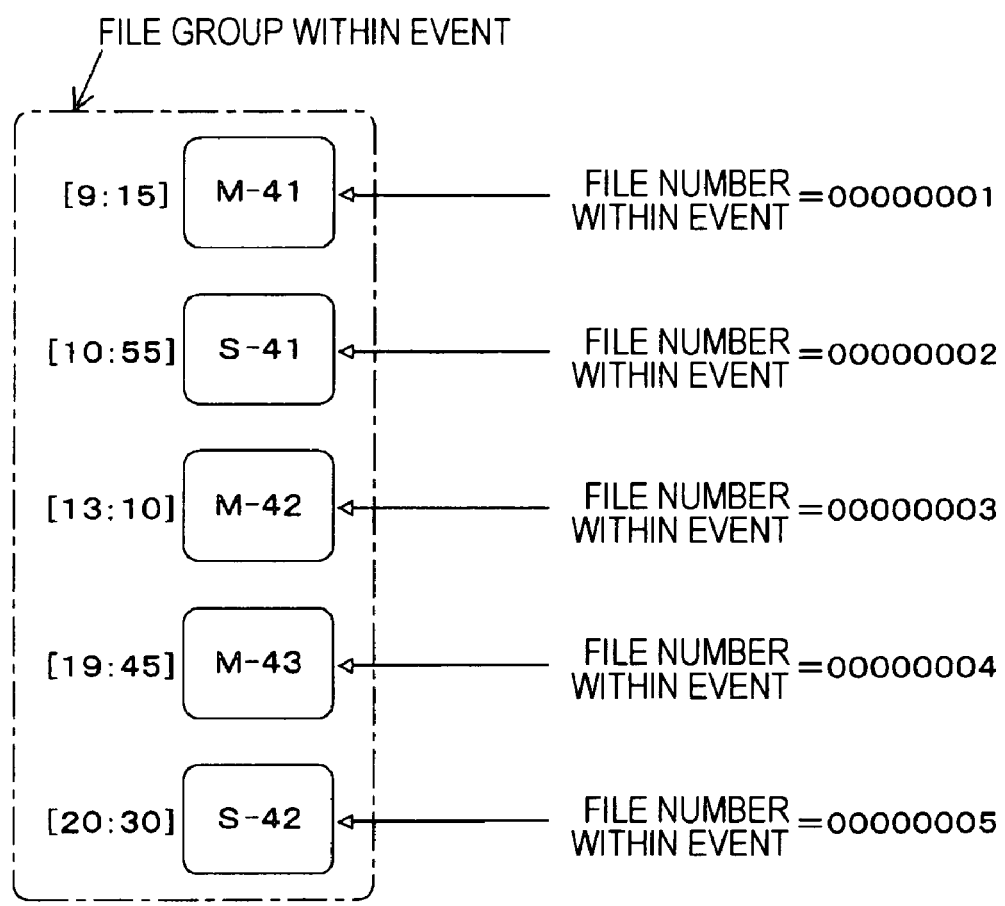
FIG. 4 shows a case where file numbers within an event are assigned to files constituting a file group within an event in the management state shown in FIG. 2.

In addition, file numbers within an event, which are serial file numbers, are assigned to files in a file group within the event. FIG. 4 shows an example of a case where file numbers within an event are assigned to files in a file group within the event [2004/5/5].

As described above, for the file group within the event [2004/5/5], the moving image file M-41, the static image file S-41, the moving image file M-42, the moving image file M-43, and the static image file S-42 are arranged in the order in which the files were recorded. In the example shown in FIG. 4, the following file numbers within the event are assigned to the files:

a file number 00000001 within the event is assigned to the moving image file M-41;

a file number 00000002 within the event is assigned to the moving image file S-41;

a file number 00000003 within the event is assigned to the moving image file M-42;

a file number 00000004 within the event is assigned to the moving image file M-43; and a file number 00000005 within the event is assigned to the moving image file S-42.

Similarly, file numbers within an event are assigned to files constituting a file group within another event.

Serial file numbers within an event are assigned to files so that a file can be selected at random from a file group within the event, as in the case for random selection of an event. In this case, the order of the serial file numbers within the event does not necessarily correspond to the order of the recorded times of the files. Serial file numbers within an event may be assigned in any order as long as a 1-to-1 relationship is achieved between a file in a file group within an event and a file number within the event.

In addition, file numbers within an event set as described above are used fixedly during a period of time from the beginning to the end of the random playback. In the procedure described below, every time a file in a file group within an event is to be played back at random, a file number within the event is set. However, the correspondence between the set file number within the event and the file is constant and does not change during a period of time from the beginning to the end of a single random playback operation.

As described above, in this embodiment, for example, the file system sets event numbers and file numbers within an event such that events and files managed by event names (directory names) and file names are suitable for random event and file selection using random numbers. Accordingly, name management for events and files is optimized for random event and file selection.

As described above, in this embodiment, event numbers and file numbers are set, and sequential playback is performed by sequentially selecting files to be played back at random in accordance with the procedure described below. In the following explanations, event numbers are set, as described above with reference to FIG. 3. Serial file numbers are assigned to files within each event in the order in which the files were recorded, as shown in FIG. 4.

Figure 5:
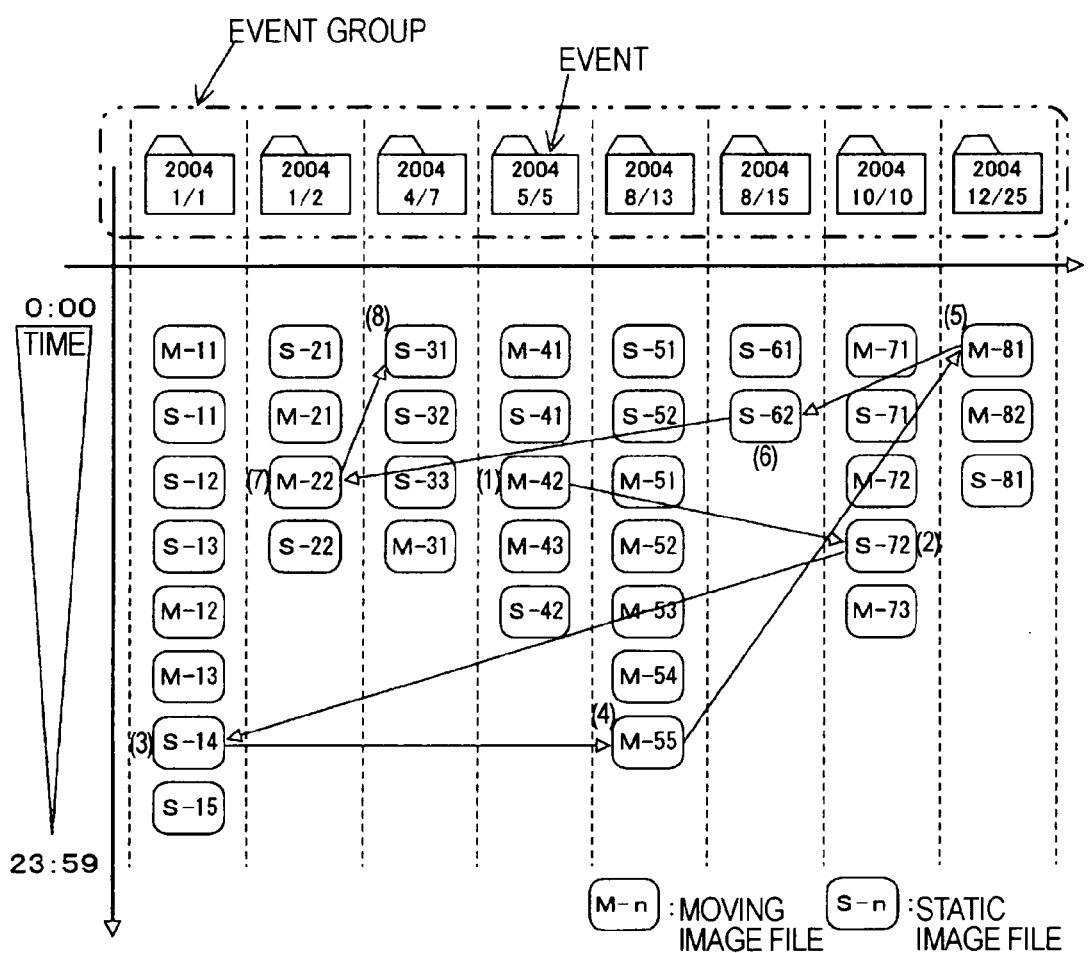
FIG. 5 shows an example of a file playback order in the first round of event selection in the management state shown in FIG. 2.
Figure 6:
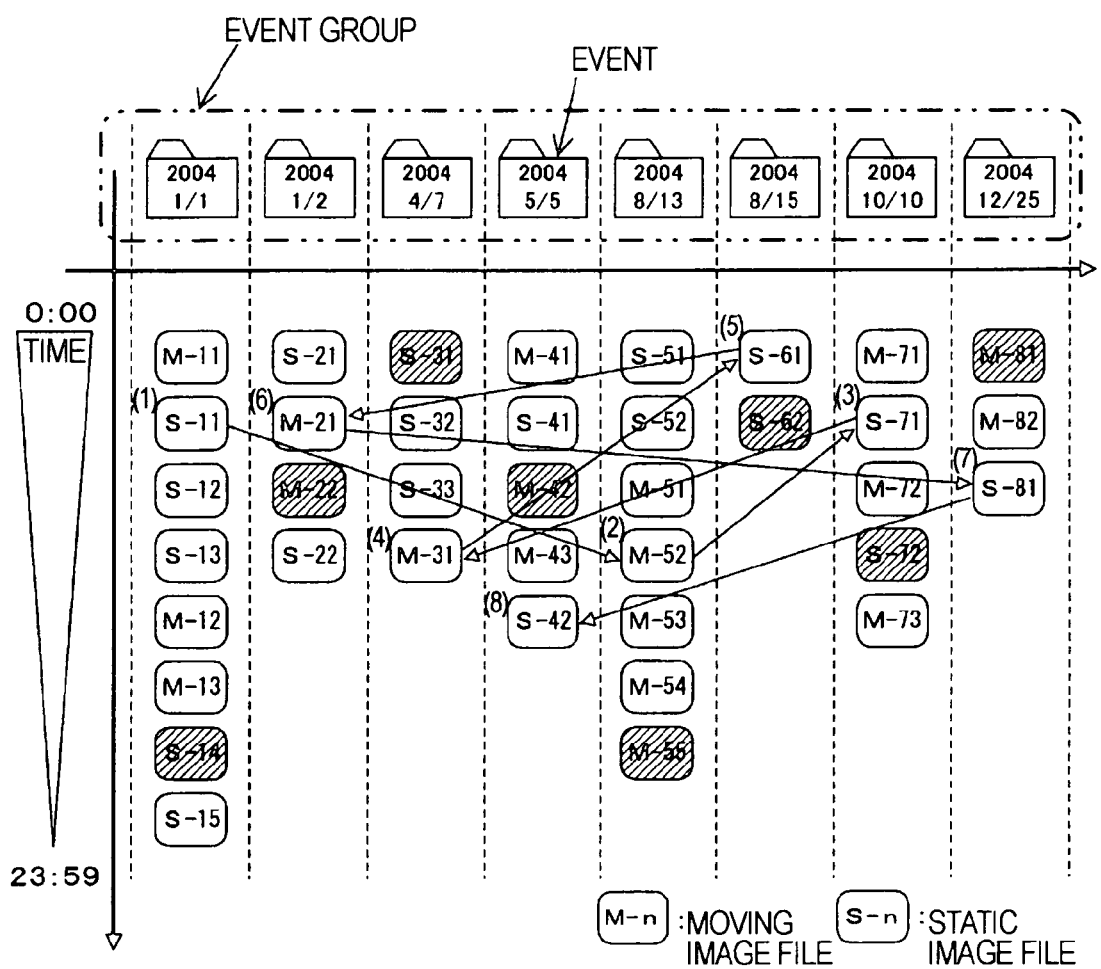
FIG. 6 shows an example of a file playback order in the second round of event selection in the management state shown in FIG. 2.

FIGS. 5 and 6 show specific examples of file selection results for random playback in this embodiment. In FIGS. 5 and 6, numbers within round brackets indicate the order in which the files are selected for random playback.

Random playback starts in response to a user operation. In this case, in response to the user operation to start the random playback, the moving image file M-42 within the event [2004/5/5] is first selected at random and played back.

That is, when event numbers and file numbers are set, as described above with reference to FIGS. 3 and 4, and the first random selection of an event is performed in response to the operation to start the random playback, the random number 00000004 is generated, and the event [2004/5/5] is selected. When random selection of a file from a file group within the event [2004/5/5] is performed, a random number 00000003 is generated, and the moving image file M-42 is selected. Thus, recorded data as the moving image file M-42 is read and played back.

After the first moving image file M-42 is selected, as described above, the second file to be played back is selected, as described below.

For the second file selection, an event is selected at random, and a file is selected at random from a file group within the selected event. In this embodiment, as described above, in order to select a file to be played back, a series of procedures for selecting an event at random and for selecting a file from a file group within the selected event is performed for each file selection.

In this embodiment, however, an event that has already been selected is excluded from candidates available for selection. Thus, an already selected event is not selected again until each of all the events has been selected by a round of event selection. Thus, each of all the events can be selected uniformly.

Accordingly, for random selection of an event in the second file selection, the event selected by the first file selection is excluded from candidates available for selection. In the example shown in FIG. 5, the event [2004/5/5] is selected by the first file selection. Thus, random selection is performed for candidates available for selection constituted by seven events not including the event [2004/5/5].

By the random selection of an event, the event [2004/10/10] is selected. Then, by random selection of a file from a file group within the event [2004/10/10], a static image file S-72 is selected. In accordance with this result, after playback of the moving image file M-42 ends, the static image file S-72 is played back, for example, during a predetermined period of time set in advance.

For random selection of an event in the third file selection, the events selected by the first and second file selection are excluded from candidates available for selection. By the random selection of an event, the event [2004/1/1] is selected. Then, by random selection of a file from a file group within the event [2004/1/1], a static image file S-14 is selected. Thus, after playback of the static image file S-72 ends, the static image file S-14 is played back.

Then, similarly, for random selection of an event in the fourth file selection, the events selected by the first to third file selection are excluded from candidates available for selection. By the random selection of an event, the event [2004/8/13] is selected. Then, by random selection of a file from a file group within the event [2004/8/13], a moving image file M-55 is selected. Thus, after playback of the static image file S-14 ends, the moving image file M-55 is played back.

For random selection of an event in the fifth file selection, the events selected by the first to fourth file selection are excluded from candidates available for selection. By the random selection of an event, the event [2004/12/25] is selected. Then, by random selection of a file from a file group within the event [2004/12/25], a moving image file M-81 is selected. Thus, after playback of the moving image file M-55 ends, the moving image file M-81 is played back.

For random selection of an event in the sixth file selection, the events selected by the first to fifth file selection are excluded from candidates available for selection. By the random selection of an event, the event [2004/8/15] is selected. Then, by random selection of a file from a file group within the event [2004/8/15], a static image file S-62 is selected. Thus, after playback of the moving image file M-81 ends, the static image file S-62 is played back.

For random selection of an event in the seventh file selection, the events selected by the first to sixth file selection are excluded from candidates available for selection. By the random selection of an event, the event [2004/1/2] is selected. Then, by random selection of a file from a file group within the event [2004/1/2], a moving image file M-22 is selected. Thus, after playback of the static image file S-62 ends, the moving image file M-22 is played back.

For random selection of an event in the eighth file selection, the events selected by the first to seventh file selection are excluded from candidates available for selection. By the random selection of an event, the event [2004/4/7] is selected.

Then, by random selection of a file from a file group within the event [2004/4/7], a static image file S31 is selected. Thus, after playback of the moving image file M-22 ends, the static image file S-31 is played back.

When the eighth file selection ends, a round of random event selection is completed. That is, a state in which each of all the eight events has been selected is achieved. When this state is achieved, for the subsequent file selection, all the selectable events are reset as candidates available for selection. Then, the subsequent file selection is performed by a procedure similar to that described above.

FIG. 6 shows an example of results of a second round of file selection after each of all the events is selected as shown in FIG. 5.

In this case, after the procedure described with reference to FIG. 5 ends (after a round of event selection is completed), all the eight events are available as candidates. As described later, an event that is not available as a candidate is an event whose all the files have already been selected and played back.

For event selection in the first file selection of the second round of file selection (that is, the ninth file selection in total) shown in FIG. 6, as mentioned above, all the eight events are set as candidates available for selection. By random selection of an event from among the eight events, the event [2004/1/1] is selected.

Then, for random selection of a file from a file group within the selected event [2004/1/1], the static image file S-14, which is selected by the first round of file selection, is excluded from candidates available for selection. This is because an already selected file is excluded from candidates available for selection in this embodiment. In accordance with such a rule, for example, the same file is not selected again until each of all the files over events has been selected.

In accordance with this, for file groups within events other than the event [2004/1/1], files that have already been selected and played back in FIG. 5 are excluded from candidates available for random selection.

Thus, the static image file S-14 in the file group within the event [2004/1/1] is excluded from candidates available for selection, and random selection of a file is performed. In the example shown in FIG. 6, by this random selection, a static image file S-11 is selected. Thus, after playback of the static image file S31, which is the last playback in FIG. 5, ends, the static image file S-11 is played back.

Then, for the second file selection, the event [2004/1/1] selected by the first file selection is excluded from candidates available for selection, and random selection of an event is performed. By this random selection, the event [2004/8/13] is selected. Then, for random selection of a file from a file group within the event [2004/8/13], the moving image file M-55, which is selected by the first round of file selection, is excluded from candidates available for selection. By this random selection, a moving image file M-52 is selected. Thus, after playback of the static image file S-11 ends, the moving image file M-52 is played back.

For the third file selection, the events selected by the first and second file selection are excluded from candidates available for selection, and random selection of an event is performed. By this random selection, the event [2004/10/10] is selected. Then, for random selection of a file from a file group within the event [2004/10/10], the static image file S-72, which is selected by the first round of file selection, is excluded from candidates available for selection. By this random selection, a static image file S-71 is selected. Thus, after playback of the moving image file M-52 ends, the static image file S-71 is played back.

For the fourth file selection, the events selected by the first to third file selection are excluded from candidates available for selection, and random selection of an event is performed. By this random selection, the event [2004/4/7] is selected. Then, for random selection of a file from a file group within the event [2004/4/7], the static image file S-31 is excluded from candidates available for selection. By this random selection, a moving image file M-31 is selected. Thus, after playback of the static image file S-71 ends, the moving image file M-31 is played back.

For the fifth file selection, the events selected by the first to fourth file selection are excluded from candidates available for selection, and random selection of an event is performed. By this random selection, the event [2004/8/15] is selected. Then, for random selection of a file from a file group within the event [2004/8/15], the static image file S-62 is excluded from candidates available for selection. By this random selection, a static image file S-61 is selected. Thus, after playback of the moving image file M-31 ends, the static image file S-61 is played back.

For the sixth file selection, the events selected by the first to fifth file selection are excluded from candidates available for selection, and random selection of an event is performed. By this random selection, the event [2004/1/2] is selected. Then, for random selection of a file from a file group within the event [2004/1/2], the moving image file M-22 is excluded from candidates available for selection. By this random selection, a moving image file M-21 is selected. Thus, after playback of the static image file S-61 ends, the moving image file M-21 is played back.

For the seventh file selection, the events selected by the first to sixth file selection are excluded from candidates available for selection, and random selection of an event is performed. By this random selection, the event [2004/12/25] is selected. Then, for random selection of a file from a file group within the event [2004/12/25], the moving image file M-81 is excluded from candidates available for selection. By this random selection, a static image file S-81 is selected. Thus, after playback of the moving image file M-21 ends, the static image file S-81 is played back.

For the eighth file selection, the events selected by the first to seventh file selection are excluded from candidates available for selection, and random selection of an event is performed. By this random selection, the event [2004/5/5] is selected. Then, for random selection of a file from a file group within the event [2004/5/5], the moving image file M-42 is excluded from candidates available for selection. By this random selection, a static image file S-42 is selected. Thus, after playback of the static image file S-81 ends, the static image file S-42 is played back.

For the third and subsequent round of file selection, similarly, each of all the eight events is selected, a file that has not been played back (that has not been selected) is selected at random from the selected event, and the selected file is played back.

In the examples shown in FIGS. 5 and 6, two static image files, the static image files S-61 and S-62, are stored in the event [2004/8/15]. Thus, after event selection shown in FIGS. 5 and 6 is performed, for the third and subsequent round of file selection, a file that has not been played back does not exist in the event [2004/8/15]. When all the files stored in an event have been played back, the event is excluded from candidates available for selection until all the files in all the events have been played back. Thus, for the first file selection in the third round of file selection, the event [2004/8/15] is excluded from candidates available for random selection of an event.

Then, similarly, events are sequentially excluded from candidates available for selection, and random selection of an event is performed. Finally, the event [2004/1/1], which stores the largest number of files, is left as a candidate available for random selection of an event. Then, the last file that is left as a file that has not been played back is selected from the event [2004/1/1], and the selected file is played back. When playback of the last file is completed, random playback of all the files recorded on the medium is completed. Records of played back files are completely cleared to enter the initial state at the beginning of random playback. Then, random playback is continued.

In this embodiment, in order to play back a file at random, an event to which a file belongs is selected at random, and each of all the events is selected in a rounding manner. That is, each of all the events is selected in a rounding manner such that random selection of an event is performed while excluding an already selected event from candidates available for selection. Then, random selection is repeatedly performed.

Thus, as a result of random playback of files, a variation in the appearance frequency of files in terms of file property as an event can be effectively reduced. In this embodiment, since events are classified on the basis of recorded dates, a variation in the frequency of files played back at random in terms of date can be effectively reduced. Although files within an event are managed on the basis of recorded times on a recorded date indicated by the event, since random selection of events is performed in a rounding manner, files recorded on the same date are not played back continuously. That is, when viewed from the standpoint of a recorded time on a recorded date, a variation in the appearance frequency is prevented.

In this embodiment, for every event selection, an event may be selected at random simply from among all the events set as candidates available for selection. In addition, for example, an algorithm in which the same events are not selected continuously may be applied to random event selection. With such a procedure or algorithm, a variation in the appearance frequency in terms of date is reduced, compared with a case where, for example, files are sequentially played back in the order of recorded date and time. However, when event selection is performed in a rounding manner, as in this embodiment, a variation in the appearance frequency in terms of date can be reduced more effectively.

In addition, for every random file selection, a file may be selected from among all the files set as candidates available for selection or file selection may be performed such that the previously selected file is not equal to the currently selected file. However, when a file within an event is selected at random while excluding an already selected image file from candidates available for selection, as in this embodiment, for example, a file selected by the first round of selection is not selected by the second round of selection. Thus, more uniformity in the appearance frequency of files in terms of recorded time can be achieved.

In addition, for random playback in this embodiment, by performing random event selection, an image file may be selected from a selected event in accordance with a predetermined rule, for example, based on a recorded date and time. This is because if at least an event is selected at random, consecutiveness corresponding to recorded date and time is not found in the order in which image files are sequentially played back. However, in this respect, a consideration is given to achieve more uniformity in the appearance frequency of files in terms of recorded time by selecting a file within an event at random, as in this embodiment.

A technological configuration for realizing the above-described random playback in this embodiment will now be described with reference to FIGS. 7 to 11.

Figure 7:
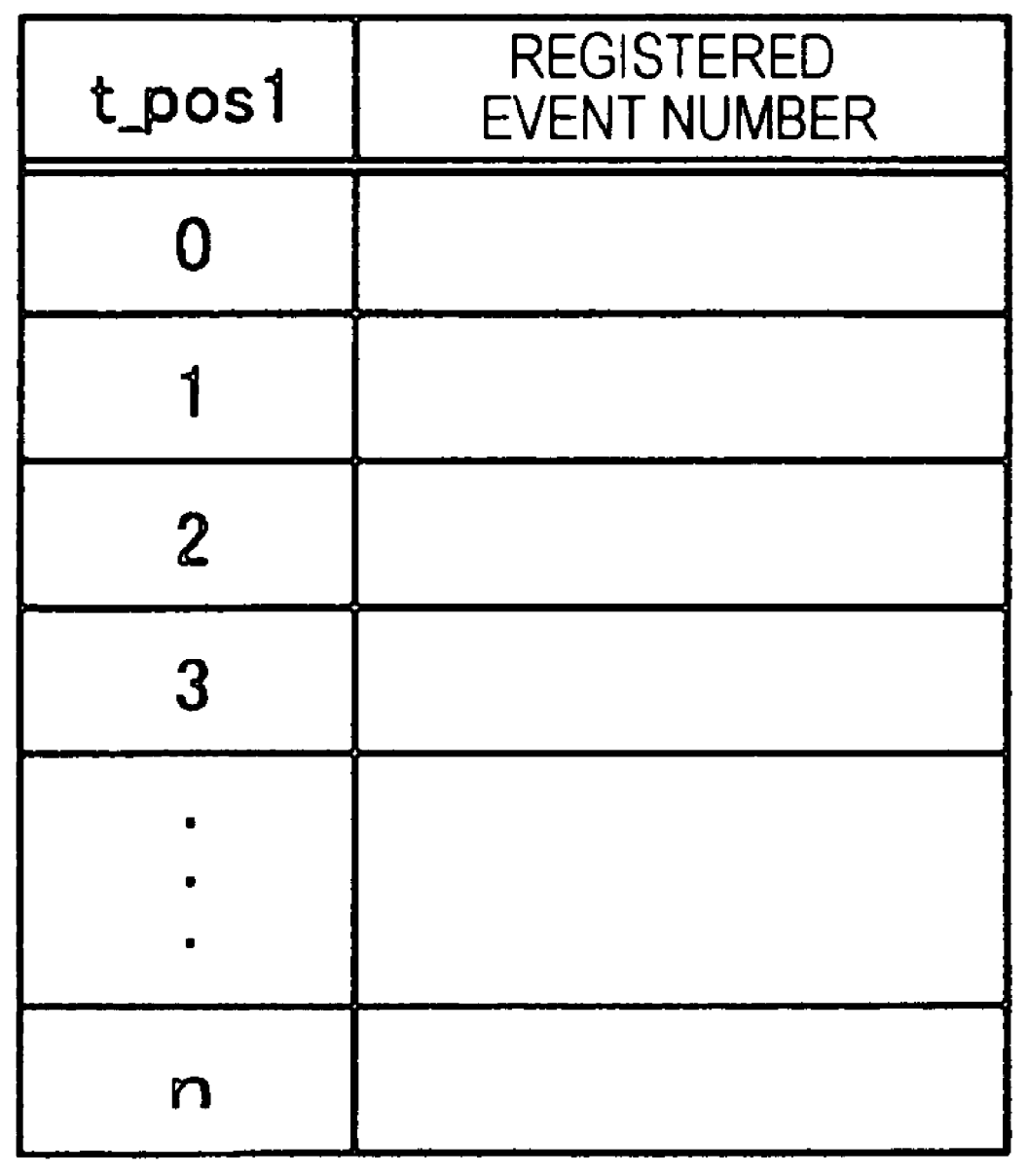

When random playback in this embodiment is performed, for example, the CPU 10 creates an event selection management table shown in FIG. 7 and a file selection management table shown in FIG. 8. By using these tables, random playback is performed while managing selected events and image files, as described later.

The event selection management table shown in FIG. 7 indicates table information used for properly performing random event selection in a rounding manner. The event selection management table manages selection records of events for each round of random event selection.

The event selection management table has a configuration in which a variable t_pos1 (=0 to n), which is represented by an integer, corresponds to an event number, as shown in FIG. 7. Each event number registered in association with a variable t_pos1 is referred to as a registered event number.

The file selection management table shown in FIG. 8 indicates table information used for performing random file selection.

The file selection management table includes table information corresponding to each event number. Each piece of table information has a configuration in which a variable t_pos2, which is represented by an integer, corresponds to a file number. Each file number registered in association with a variable t_pos2 is referred to as a registered file number.

Figure 9:
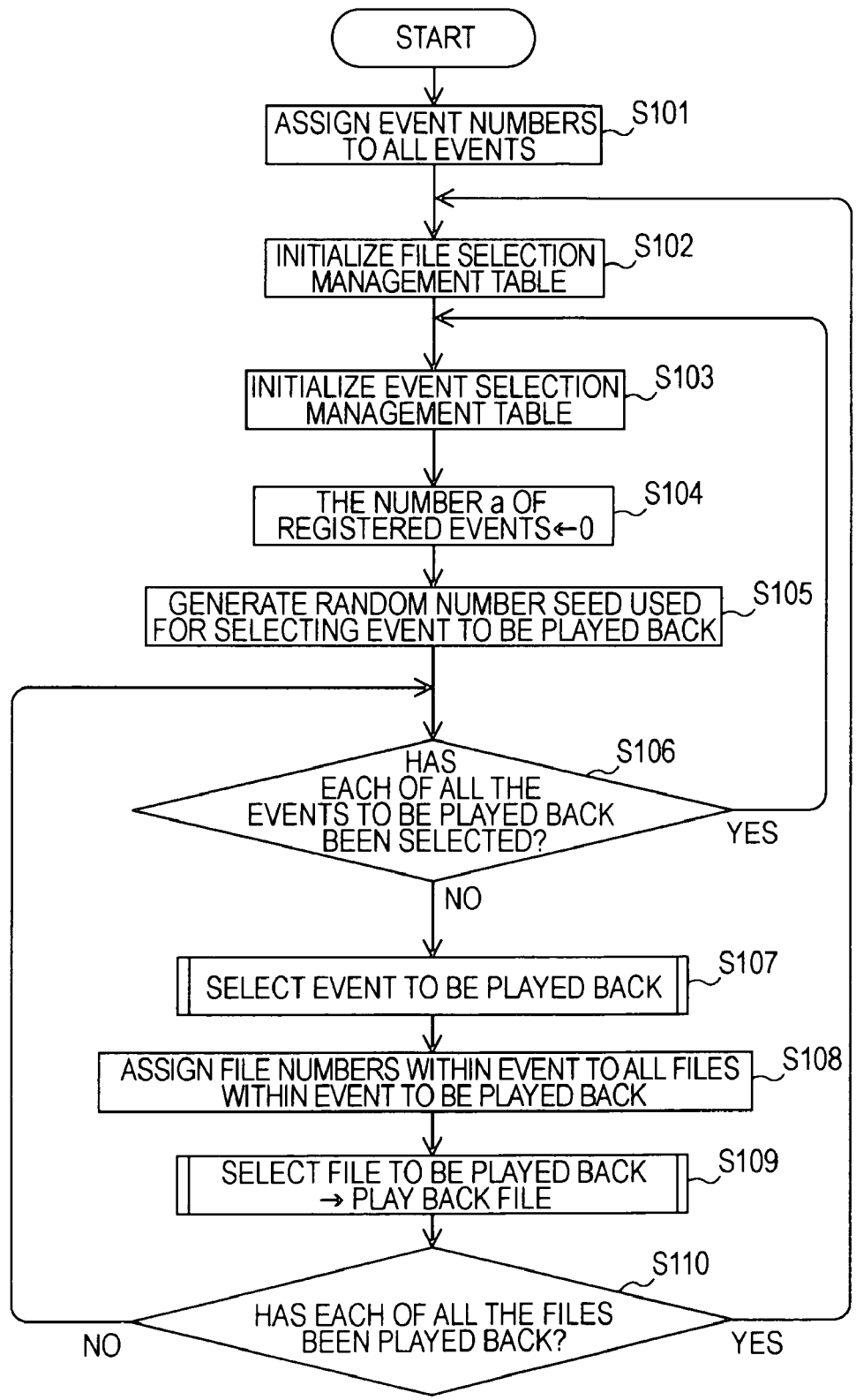
FIG. 9 is a flowchart of a random playback process.
Figure 10:
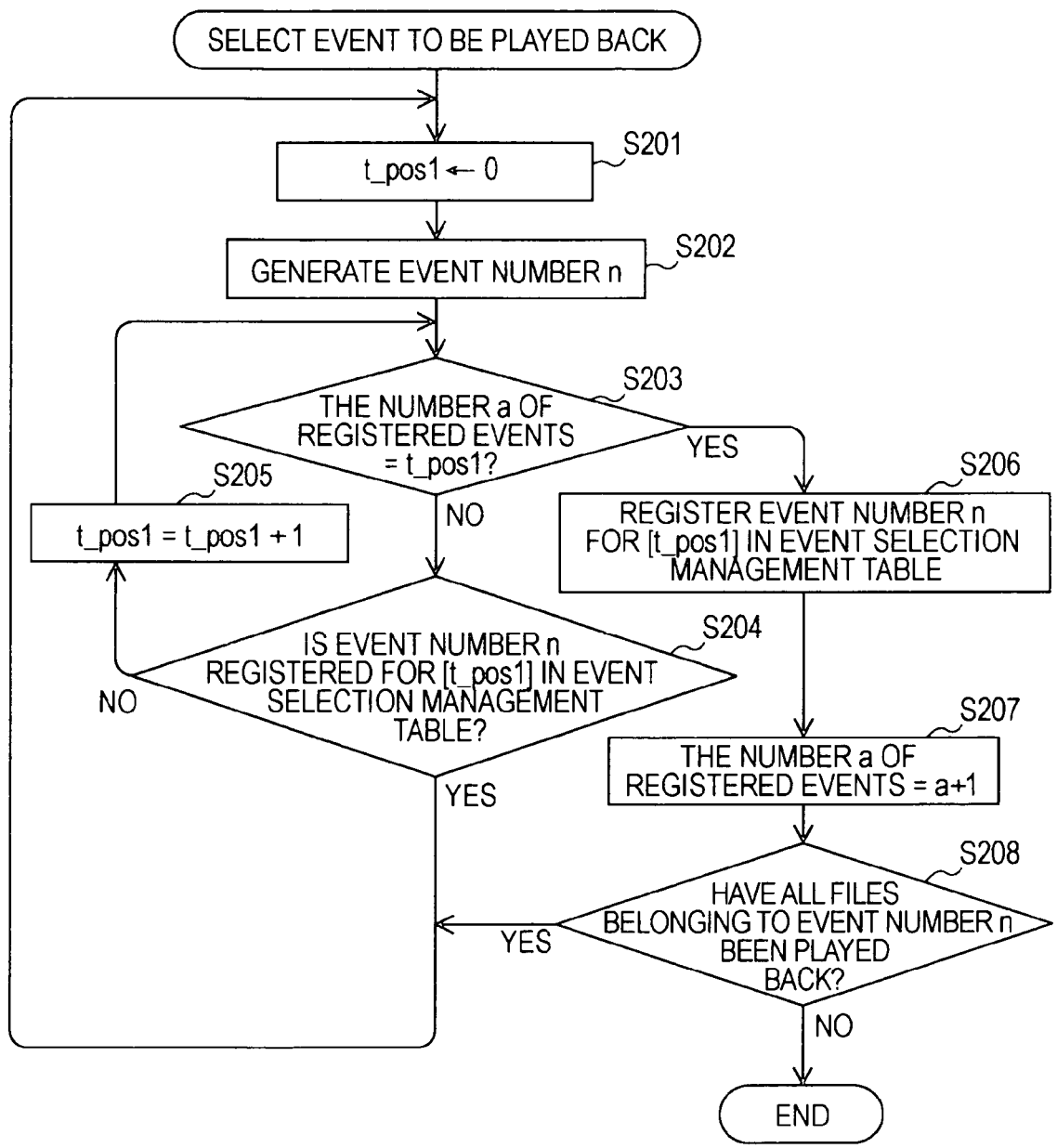
FIG. 10 is a flowchart of a process for selecting an event to be played back in the random playback process.
Figure 11:
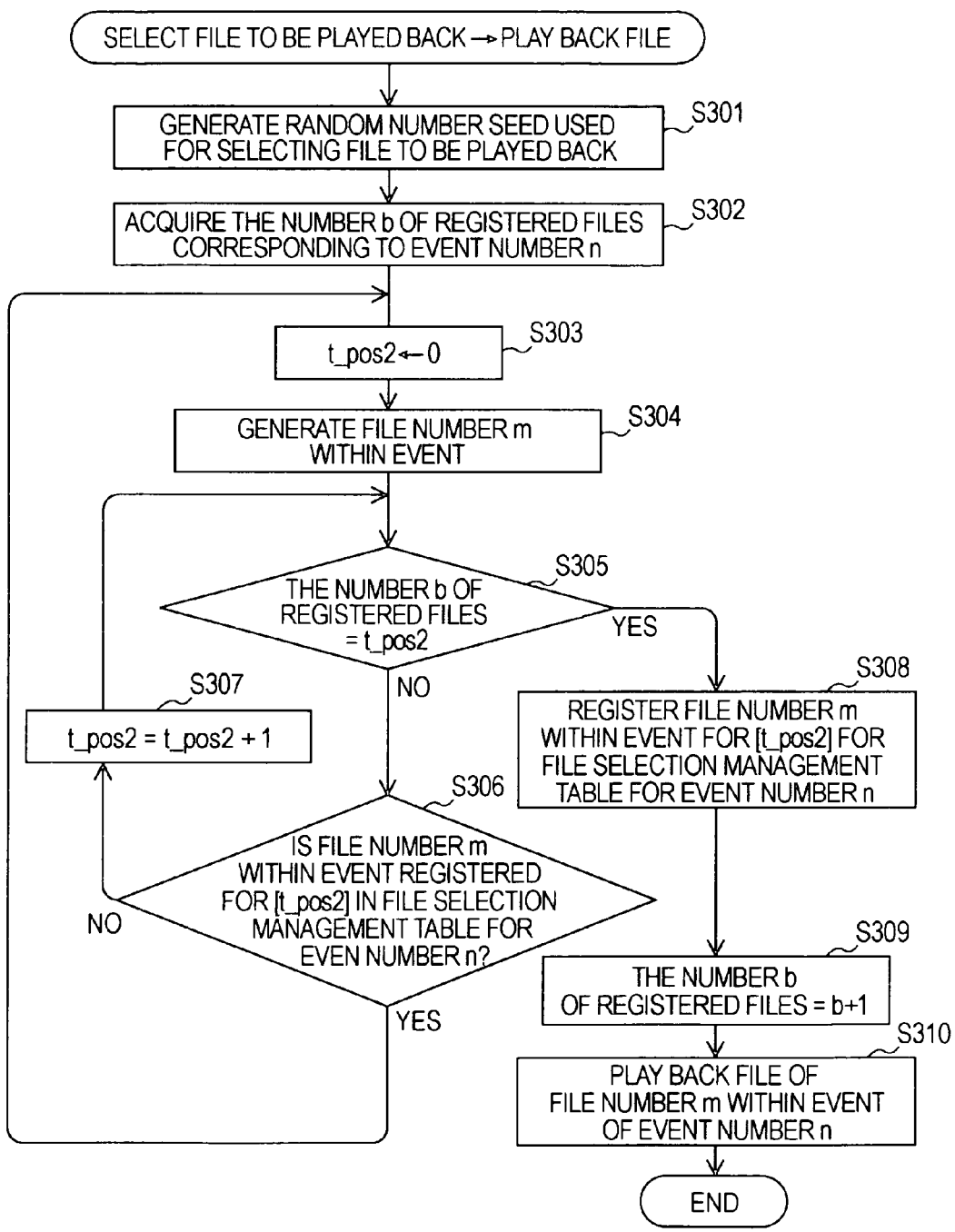
FIG. 11 is a flowchart of a process for selecting a file to be played back and for playing back the selected file in the random playback process.

Flowcharts shown in FIGS. 9 to 11 show processes performed for random playback in this embodiment. The processes shown in FIGS. 9 to 11 are, for example, processes performed for random playback by the CPU 10 in accordance with a program and corresponding operations performed by sections of the digital camera 1. In this embodiment, the program to be executed by the CPU 10 is stored in advance in the ROM 11 or the nonvolatile memory 12a. However, for example, the program may be stored on any medium supported by the digital camera 1 according to this embodiment and may be installed and stored into the ROM 11. Alternatively, by providing a network communication function as the communication section 16 of the digital camera 1, data of a program transmitted from an external server or terminal may be received via a network and installed.

The digital camera 1 according to this embodiment starts random playback, for example, in response to a user instruction to perform random playback. In response to this instruction, for example, processing from step S101 shown in FIG. 9 is performed. In FIG. 1, the HDD, the optical disc, the magnetic optical disc, and the semiconductor memory device are shown as examples of media supported by the digital camera 1. By the time when the instruction to perform random playback is given, a medium that is to be subjected to random playback has already been designated.

In step S101, event numbers are assigned to all the events recorded and set for managing image files on a medium to be subjected to random playback. The events set on the medium are acquired together with the event names thereof by accessing the file system for the medium. Event numbers are assigned to the acquired events, as described above with reference to FIG. 3.

In step S102, the file selection management table shown in FIG. 8 is initialized. In the initialized state, for example, an effective value as a registered file number is not registered in table information corresponding to each registered event number shown in FIG. 8.

In step S103, the event selection management table is initialized. In the initialized state of the event selection management table, an effective value as a registered event number is not registered.

In step S104, a variable a (the number a of registered events) representing the number of registered events is set to 0. The number a of registered events indicates the number of events registered in the event selection management table. Information, such as the number a of registered events and the number b of registered files, which will be described later, can be written and stored into the RAM 12, for example, under the control of the CPU 10.

In step S105, a random number seed used for selecting an event to be played back is generated. The event to be played back is an event that is confirmed as being selected as an event whose file is to be played back in random playback.

In step S106, it is determined whether or not each of all the events to be played back has been selected by the processing for random event selection. In this embodiment, as described above with reference to FIG. 6, if all the files stored in an event have been played back, the event is excluded from candidates available for selection of an event to be played back. Thus, in step S106, it is determined whether or not each of all the events to be played back from among the selectable candidate events has been selected. For example, for a third round of event selection in the case shown in FIG. 6, since two files are stored in the event [2004/8/15], it is determined whether or not each of all the seven selectable candidate events not including the event [2004/8/15] has been selected in step S106. In addition, this determination is achieved by referring to the event selection management table and the file selection management table. That is, in response to generation of random numbers, event numbers selected as events to be played back are registered in the event selection management table. However, the registered event numbers include an event number of an event whose all the files have already been played back, as explained in the following processing. Thus, by referring to the file selection management table, the event number of the event whose all the files have already been played back is recognized. Then, the recognized result is compared with the registered event numbers in the event selection management table. Thus, the event whose all the files have already been played back is excluded from candidates available for selection, and it is determined whether or not each of all the events to be played back from among the selectable candidate events has been selected.

If the determination in step S106 is YES, the process returns to step S103. Then, the next round of event selection starts from the beginning.

If the determination in step S106 is NO, since each of all the events to be played back from among selectable candidate events has not been selected, the process proceeds to step S107.

In processing of steps S107 to S110, processing for finally selecting an image file and for playing back the selected image is performed. Thus, in step S107, a process for selecting an event that stores an image file to be played back is performed.

The process of step S107 for selecting an event to be played back is shown by the flowchart of FIG. 10.

Referring to FIG. 10, in step S201, a variable t_pos1 used in the event selection management table is set to 0.

In step S202, an event number n is generated. In the processing of step S202, an event is selected at random by designating the event number. In order to designate the event number, a random number is generated using the random number seed generated in step S105 in FIG. 9, and the generated numerical value is used as the event number n.

In step S203, it is determined whether or not the number a of currently registered events is equal to the current variable t_pos1. When the determination in step S203 is YES, the event number n generated by the last processing of step S202 is not registered in the event selection management table. In contrast, when the determination in step S203 is NO, the event number n generated by the last processing of step S202 may have already been registered in the event selection management table.

For example, when the processing of step S203 is performed for the first time since random playback started, no event number is registered in the event selection management table. At this time, the number of registered events is 0, and the variable t_pos1 is set to 0 in step S201. Thus, the determination in step S203 in this case is YES.

If the determination in step S203 is NO, the process proceeds to step S204. In step S204, it is determined whether or not the event number n generated by the last processing of step S202 is registered in association with a value indicated by the current variable [T_pos1] in the event selection management table. If the determination in step S204 is NO, the process proceeds to step S205. In step S205, the variable t_pos1 is incremented by 1, as represented by t_pos1 =t_pos1+1. Then, the process returns to step S203. In contrast, if the determination in step S204 is YES, since the current event number n has already been registered in the event selection management table, the process returns to step S201 to acquire a new event number n. By the processing flow from the positive determination in step S204 to the processing of step S201, if an event has already been selected as an event to be played back and one of files stored in the event has already been played back in a round of event selection, the event is not selected again as being played back. That is, in a round of event selection, an event that has already been selected is excluded from candidates available for selection of an event to be played back.

If the determination in step S203 is YES, the process proceeds to step S206.

In step S206, the event number n generated by the last processing of step S202 is registered in association with the current variable [t_pos1] in the event selection management table. In accordance with the processing of step S206, the number a of registered events is incremented by 1, as represented by a =a+1, in step S207. By the processing of steps S206 and S207, registration of a new event into the event selection management table is confirmed.

In step S208, for the event represented by the event number n, which is newly registered in the event selection management table by step S206, it is determined whether or not all the files stored in the event have already been played back. The state in which all the files have already been played back means a state in which all the files have already been played back in a round of playback of files.

The determination in step S208 is achieved, for example, by referring to a registered condition of registered file numbers in table information of the file selection management table corresponding to the event number n. For example, if all the file numbers within the event assigned to the files stored in the event represented by the event number n are registered at least once as registered file numbers in the table information of the file selection management table corresponding to the event number n, the determination in step S208 is YES.

If the determination in step S208 is NO, the process shown in FIG. 10 is terminated. Then, the process proceeds to step S108 in FIG. 9. This means that the event represented by the event number n is confirmed as an event to be played back and that, in the subsequent processing, a file to be played back is selected from among files stored in the confirmed event.

In contrast, if the determination in step S208 is YES, the process returns to step S201. Then, selection of an event to be played back is performed again. By the processing flow from the positive determination in step S208 to the processing of step S201, an event whose all the files have already been played back is not selected as an event to be played back. That is, the event whose all the files have already been played back is excluded from candidates available for selection of an event.

Referring back to FIG. 9, in step S108, file numbers within an event are assigned to all the files stored in the event selected as an event to be played back (the event represented by the event number n). Assignment of the file numbers within the event by the processing of step S108 is performed in accordance with a predetermined rule. The processing of step S108 is performed every time selection of an event to be played back in step S107 is confirmed in the process of random playback. The same relationship between the files within the event and the file numbers within the event can be obtained every time the processing of step S108 is performed.

In step S109, a process for finally confirming selection of a file to be played back and for playing back the confirmed file is performed. The process of step S109 is shown by the flowchart of FIG. 11.

Referring to FIG. 11, in step S301, a random number seed used for selecting a file to be played back is generated. In step S302, the number b of registered files, which is the number of files registered in table information of the file selection management table corresponding to the event number n, is acquired.

In step S303, a variable t_pos2, which is used in the file selection management table, is set to 0. In step S304, a random number is generated using the random number seed generated in step S301, and a file number m within the event is generated using the generated random number. By this processing, a file to be played back is selected at random from among files within the same event.

In step S305, it is determined whether or not the number b of currently registered files is equal to the current variable t_pos2. When the determination in step S305 is YES, the file number m within the event generated by the last processing of step S304 is not registered in the file selection management table. In contrast, when the determination in step S305 is NO, the file number m within the event generated by the last processing of step S304 may have already been registered in the event selection management table.

If the determination in step S305 is NO, the process proceeds to step S306. In step S306, it is determined whether or not the file number m within the event generated by the last processing of step S304 is registered in association with a value indicated by the current variable [t_pos2] in the table information of the file selection management table for the event number n.

If the determination in step S306 is NO, the process proceeds to step S307. In step S307, the variable t_pos2 is incremented by 1. Then, the process returns to step S305. In contrast, if the determination in step S306 is YES, the process returns to step S303. In step S303, processing for re-generating a file number m within the event is performed. By the processing flow from the positive determination in step S306 to the processing of step S303, in a round of playback of files, a file that has already been played back is not selected again as a file to be played back. That is, in a round of selection of files to be played back, the file that has already been selected is excluded from candidates available for selection of a file to be played back.

If the determination in step S305 is YES, the process proceeds to step S308.

In step S308, the file number m within the event generated by the last processing of step S304 is registered in association with the current variable t_pos2 in the table information of the file selection management tale for the event number n. Then, in step S309, the number b of registered files is incremented by 1. Thus, selection of the file to be played back is confirmed.

Then, in step S310, control for reading from the medium the file confirmed as the file to be played back and for playing back the file is performed.

In this processing, the file represented by the file number m, which is stored in the event to be played back represented by the event number n, is played back. The event number and the file number within the event are provided in order to achieve correspondence between random numbers used for random selection and the event and file. For playback of a file, an event name and a file name are acquired from the event number and the file number within the event, and, for example, access control is performed using the file system. Thus, a desired file can be accessed and played back. For example, as described above, static image files are displayed over a predetermined period of time set in advance. In addition, moving image files are continuously displayed from the beginning to the end thereof.

Referring back to FIG. 9, after a file is played back by the processing of step S109, the process proceeds to step S110. In step S110, it is determined whether or not each of all the files to be subjected to random playback has been played back. For this processing, it can be determined, by referring to table information of the file selection management table corresponding to an event number, whether or not the number of files registered in the table information of the file selection management table is equal to the actual number of files in the corresponding event. Alternatively, for the processing of step S110, it may be determined whether or not the number b of registered files stored for an event number is equal to the actual number of files in the corresponding event.

If the determination in step S110 is NO, the process returns to step S106. Thus, in order to select a file to be played back from among files that have not been played back, processing for selecting an event to be played back and for selecting a file to be played back is restarted.

In contrast, if the determination in step S110 is YES, the process returns to step S102. Thus, the event selection management table, the file selection manage table, and the various variables used in the previous processing are initialized, and random playback is restarted.

For example, if an instruction to stop random playback is given during the processing shown in FIG. 9, 10, or 11, processing for random playback is interrupted.

The present invention is not limited to the configuration according to the foregoing embodiment.

For example, although events (classified regions), which are logical regions in which image files including moving image files and static image files to be recorded on media are stored, are classified by recorded date in the foregoing embodiment, this classification is merely an example. That is, events may be classified by any other classification criteria. For example, events can be classified by place and area where files were recorded. Events may be automatically generated in accordance with recording of files, as in the foregoing embodiment. Alternatively, events may be created in accordance with a user operation or the like. In this case, a user can manage an event such that files already recorded on a medium can be stored in the event.

In addition, although files to be subjected to random playback are image data based on moving images and static images in the foregoing embodiment, for example, audio data may be subjected to random playback.

In addition, although the present invention is applied to the digital camera 1 in the foregoing embodiment, for example, the present invention can also be applied to any apparatus as long as, for example, the apparatus is capable of playing back media on which unit data corresponding to a file unit is recorded.

In addition, processes for random playback performed by the playback apparatus are not limited to the processes described above with reference to the flowcharts shown in FIGS. 9 to 11. The processes may be changed where necessary in accordance with the actual conditions or the like.

It should be understood by those skilled in the art that various modifications, combinations, sub-combinations and alterations may occur depending on design requirements and other factors insofar as they are within the scope of the appended claims or the equivalents thereof.

The invention claimed is:

1. A playback apparatus, comprising:
classified region selecting means for selecting a classified region at random from among a plurality of classified regions on a recording medium, the recording medium including recorded data managed such that a plurality of pieces of unit data belong to corresponding classified regions serving as data storage logical regions generated in accordance with a predetermined classification rule;
unit data selecting means for selecting a piece of unit data from among the pieces of unit data that belong to the selected classified region;
reading means for reading from the recording medium the selected piece of unit data in order to play back the selected piece of unit data; and
execution control means for controlling the repeated execution of a series of selecting and reading operations including selection of a classified region from the classified regions available for selection by the classified region selecting means, selection of a piece of unit data by the unit data selecting means, and reading of the selected piece of unit data by the reading means, wherein a classified region already selected is excluded from the classified regions available for selection.

2. The playback apparatus according to claim 1, wherein the classified region selecting means selects the classified region by excluding at least the most recently selected classified region from the classified regions available for selection.

3. The playback apparatus according to claim 1, wherein the classified region selecting means selects the classified region by excluding classified regions that have already been selected from the classified regions available for selection.

4. The playback apparatus according to claim 1, wherein the classified region selecting means selects the classified region in a state in which all the classified regions are set as candidates available for selection when all of the classified regions have been selected at least once by the previous selecting and reading operations.

5. The playback apparatus according to claim 4, wherein the classified region selecting means selects the classified region by excluding from the classified regions available for selection classified regions in which all of the pieces of unit data of the classified region have already been read by the reading means.

6. The playback apparatus according to claim 1, further comprising:
classified region number assigning means for assigning a number to each of the classified regions,
wherein the classified region selecting means selects the classified region in accordance with a correspondence between a generated random number and the number assigned to the classified region.

7. The playback apparatus according to claim 1, wherein the unit data selecting means selects the piece of unit data at random from among the pieces of unit data that belong to the selected classified region.

8. The playback apparatus according to claim 1, wherein the unit data selecting means selects the piece of unit data by excluding at least the most recently selected piece of unit data from the pieces of unit data that belong to the selected classified region and that are available for selection.

9. The playback apparatus according to claim 1, wherein the unit data selecting means selects the piece of unit data by excluding from the pieces of unit data available for selection the pieces of unit data that belong to the selected classified region and that have already been selected.

10. The playback apparatus according to claim 7, further comprising:
unit data number assigning means for assigning a number to each of the pieces of unit data within the classified region,
wherein the unit data selecting means selects the piece of unit data in accordance with a correspondence between a generated random number and the number assigned to the piece of unit data.

11. A playback method, comprising:
selecting a classified region at random from among a plurality of classified regions on a recording medium, the recording medium including recorded data managed such that a plurality of pieces of unit data belong to corresponding classified regions serving as data storage logical regions generated in accordance with a predetermined classification rule;
selecting a piece of unit data from among the pieces of unit data that belong to the selected classified region;
reading from the recording medium the selected piece of unit data in order to play back the selected piece of unit data; and
controlling, by a processor, the repeated execution of a series of selecting and reading operations including selection of a classified region from the classified regions available for selection, selection of a piece of unit data, and reading of the selected piece of unit data, wherein the selecting operations include, in sequence, selecting at random a piece of unit data from a plurality of pieces of unit data available for selection belonging to a classified region selected at random and selecting at random a classified region from the classified regions available for selection from which a classified region already selected including at least one piece of unit data available for selection is excluded.

12. A non-transitory recording medium recorded with computer-readable program for causing a playback apparatus to perform a playback process, the process comprising:
selecting a classified region at random from among a plurality of classified regions on a recording medium, the recording medium including recorded data managed such that a plurality of pieces of unit data belong to corresponding classified regions serving as data storage logical regions generated in accordance with a predetermined classification rule;
selecting a piece of unit data from among the pieces of unit data that belong to the selected classified region;
reading from the recording medium the selected piece of unit data in order to play back the selected piece of unit data; and
controlling the repeated execution of a series of selecting and reading operations including selection of a classified region from the classified regions available for selection, selection of a piece of unit data, and reading of the selected piece of unit data, wherein the selecting operations include, in sequence, selecting at random a piece of unit data from a plurality of pieces of unit data available for selection belonging to a classified region selected at random and selecting at random a classified region from the classified regions available for selection from which a classified region already selected including at least one piece of unit data available for selection is excluded.

13. A playback apparatus, comprising:
a classified region selecting circuit that selects a classified region at random from among a plurality of classified regions on a recording medium, the recording medium including recorded data managed such that a plurality of pieces of unit data belong to corresponding classified regions serving as data storage logical regions generated in accordance with a predetermined classification rule;
a unit data selecting circuit that selects a piece of unit data from among the pieces of unit data that belong to the selected classified region;
a read circuit that reads from the recording medium the selected piece of unit data in order to play back the selected piece of unit data; and
an execution controller circuit that controls the repeated execution of a series of selecting and reading operations including selection of a classified region from the classified regions available for selection by the classified region selecting circuit, selection of a piece of unit data by the unit data selecting circuit, and reading of the selected piece of unit data by the read circuit, wherein the selecting operations include, in sequence, selecting at random a piece of unit data from a plurality of pieces of unit data available for selection belonging to a classified region selected at random and selecting at random a classified region from the classified regions available for selection from which a classified region already selected including at least one piece of unit data available for selection is excluded.

* * * * *